3 Sheets—Sheet 1.

D. H. FANNING.

Corset.

No. 8,663. Reissued April 8, 1879.

Witnesses.
L. F. Connor.
N. E. Whitney.

Inventor.
David H. Fanning
by Crosby & Gregory
Attys.

N. PETERS. PHOTO-LITHOGRAPHER, WASHINGTON, D. C.

D. H. FANNING.

Corset.

No. 8,663. Reissued April 8, 1879.

Witnesses:
L. F. Connor.
N. E. Whitney.

Inventor:
David H. Fanning
by Crosby & Gregory
Attys

N. PETERS, PHOTO-LITHOGRAPHER, WASHINGTON, D. C.

D. H. FANNING.

Corset.

No. 8,663. Reissued April 8, 1879.

*Witnesses:*
L. F. Connor
H. E. Whitney.

*Inventor:*
David H. Fanning,
by Crosby & Gregory
Attys

N. PETERS, PHOTO-LITHOGRAPHER, WASHINGTON, D. C.

UNITED STATES PATENT OFFICE.

DAVID H. FANNING, OF WORCESTER, MASSACHUSETTS, ASSIGNOR TO HIMSELF AND THEODORE C. BATES.

IMPROVEMENT IN CORSETS.

Specification forming part of Letters Patent No. 159,753, dated February 16, 1875; Reissue No. 8,663, dated April 8, 1879; application filed December 14, 1878.

*To all whom it may concern:*

Be it known that I, DAVID H. FANNING, of Worcester, county of Worcester, and State of Massachusetts, have invented certain new and useful Improvements in Corsets, of which the following is a specification.

My invention is exemplified in a corset having three gores at the front to complete the bust. The center or middle gore, made narrower at its ends than at its middle, or tapering toward both ends, is so placed between the adjacent pieces composing the front of the corset as to intersect a seam which extends downward from the lower end of said center gore, said seam providing for the inward curve of the corset to enable it to be shaped to the waist.

In order to enable others skilled in the art to which my invention appertains to make and use the same, I will now proceed to describe its construction and operation, referring to the annexed drawings, which form a part of this specification, and in which—

Figure 1:
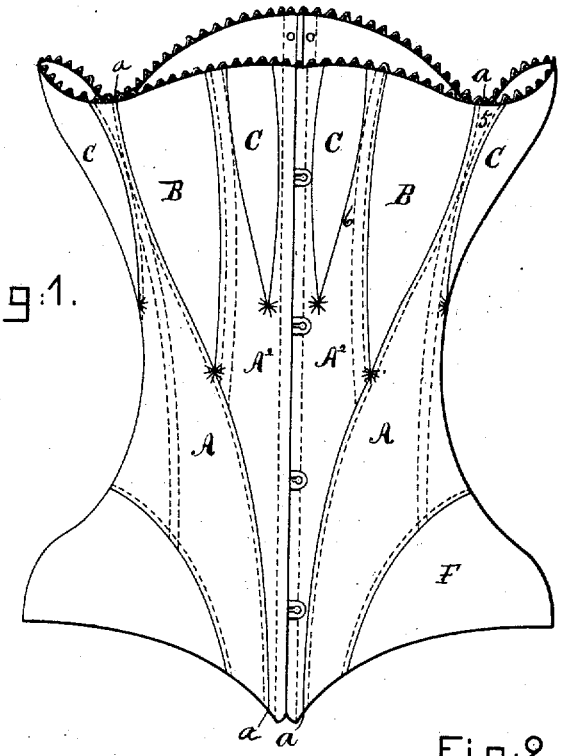
Figure 2:
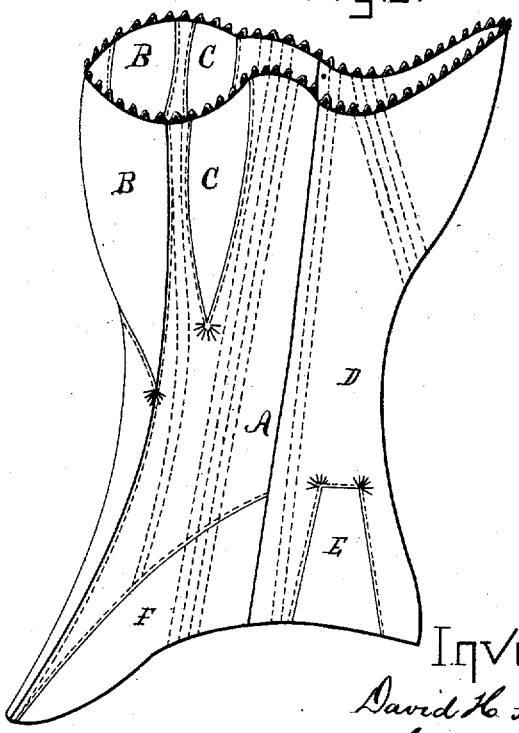
Figure 3:
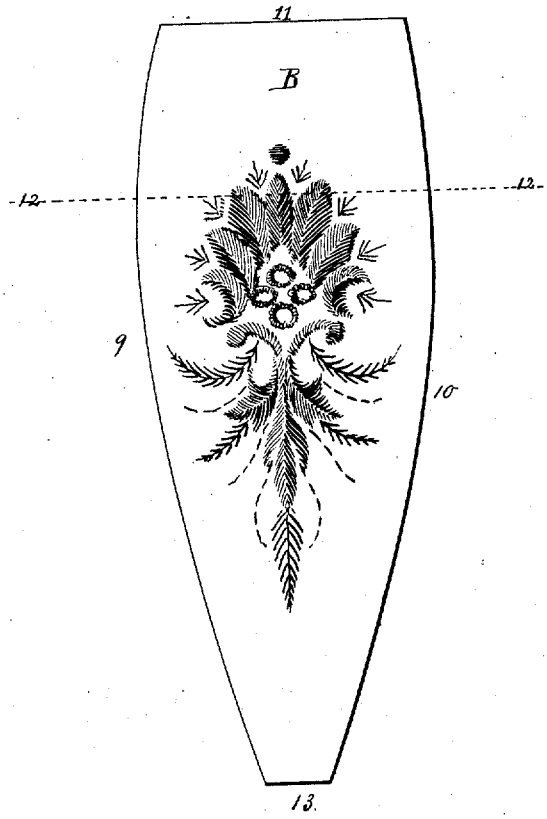
Figure 4:
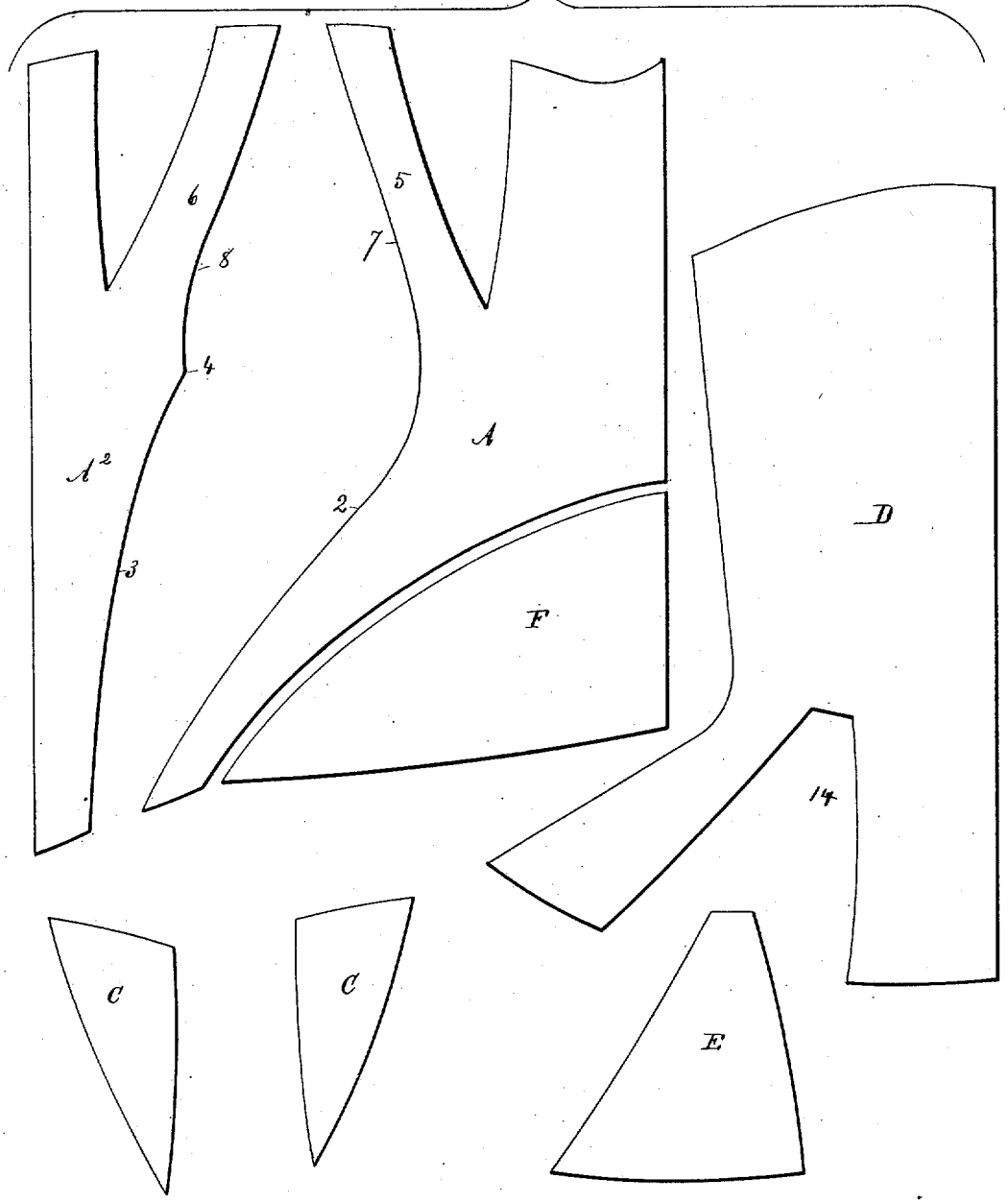

Figure 1 is a front view of a corset embodying my invention. Fig. 2 is a view of one side thereof in perspective. Fig. 3 represents the piece B; and Fig. 4 represents in detail each of the several pieces, except B, which enter into one-half of the corset, Fig. 1, the said pieces being shown one-half smaller than the scale of Fig. 3.

The front of each half of the corset is composed of two independent main pieces, A $A^2$, cut each from their lower ends to the lower end of the center or bust piece, B, on curved lines, making edges 2 3, which are stitched together, and from point 4 upward (where the two pieces A $A^2$, or parts 5 6 of the said pieces, are stitched to the opposite edges of the center or bust gore, B) the edges 7 8 are cut on inward or receding curves.

The seam *a*, made by uniting the edges 2 3, (see Fig. 1,) enables the said pieces to be cut and curved to the proper degree to give any necessary or desired curvature at the waist, which is a matter of much importance to insure accuracy of fit. Between these two pieces A $A^2$, at top, is inserted the center gore, B, of the bust, and the two pieces are sewed to the curved sides 9 10 down to the point 4, from which point downward the two pieces A $A^2$ are sewed together.

The center gore, (see Fig. 3,) instead of being widest at its upper end, 11, as usual, is made to taper from its widest part, on or about at the line 12, Fig. 3, toward its top 11 and bottom 13.

The back part of each half of the corset is shown composed of a piece, D, (see Fig. 4,) notched, as at 14, to receive the hip-gore E. The front of the hip is shown as composed of a gore-piece, F, connected with A and D.

On each side of the center gore, B, is a side gore, C, inserted in the usual manner by simply cutting or splitting the front to a suitable depth.

I am aware that a corset having three bust-gores in each front is not new, and I do not claim such, broadly, as my invention. Such gores have heretofore been inserted in the ordinary manner without any seam intersecting the middle gore, and hence they could not be made to fit perfectly to the body; but by cutting the corset through from below the middle gore, B, as above described, and making the said gore to intersect the seam, the patterns may be cut in such a way that a most graceful curve is obtained, and the corset will fit perfectly with ease and comfort to the wearer.

I claim—

1. A corset having in each front at the bust two side gores, C C, and a center gore, the latter extending to and intersecting the seam *a*, substantially as and for the purposes herein set forth.

2. In a corset, a center gore-piece, B, tapered toward each end, to make its ends narrower than the main central part of the gore, combined and joined with main pieces of the front of the corset at each side of the said gore-piece, it intersecting at its lower end the seam or line of stitches which unites or connects the said main pieces, to enable the corset to be shaped substantially as described.

3. In the front of a corset, two pieces extended from the bottom to the top of the corset at each side of a center or bust gore, tapered at both ends, the said pieces at their edges below the gore pieces being each cut on inwardly-curved lines, forming edges, which are sewed together below the center gore, substantially as described.

DAVID H. FANNING.

Witnesses:

HENRY BACON,

FRDK. J. BARNARD.